United States Patent

Montangero et al.

[11] Patent Number: 6,035,279
[45] Date of Patent: Mar. 7, 2000

[54] PRIZE AWARDING REMOTE TERMINAL BASE SYSTEM

[75] Inventors: Enrico Montangero, Milan; Stefano Reato, Varese, both of Italy

[73] Assignee: Markidea S.R.L., Milan, Italy

[21] Appl. No.: 08/591,374

[22] Filed: Jan. 25, 1996

[51] Int. Cl.[7] .............................................. H04M 11/00
[52] U.S. Cl. .......................................................... 705/14
[58] Field of Search .................... 463/25, 17; 379/93.13, 379/93.12; 273/269, 138.2; 705/14, 10, 16; 235/380

[56] References Cited

U.S. PATENT DOCUMENTS

| | | | |
|---|---|---|---|
| 4,669,730 | 6/1987 | Small | 463/17 |
| 4,689,742 | 8/1987 | Troy et al. | 463/25 |
| 4,845,739 | 7/1989 | Katz | 379/93.13 |
| 4,854,590 | 8/1989 | Joliiff et al. | 273/138 |
| 4,882,473 | 11/1989 | Bergeron et al. | 235/380 |
| 4,906,826 | 3/1990 | Spencer | 235/379 |
| 5,227,874 | 7/1993 | Von Kohorn | 705/10 |
| 5,365,575 | 11/1994 | Katz | 379/93.13 |
| 5,620,182 | 4/1997 | Rossides | 273/138.2 |
| 5,624,119 | 4/1997 | Leake | 273/269 |
| 5,663,547 | 9/1997 | Ziarno | 235/380 |

FOREIGN PATENT DOCUMENTS 3330301 3/1985 Germany .

Primary Examiner—Kevin J. Teska
Assistant Examiner—Dan Fiul
Attorney, Agent, or Firm—Ladas & Parry

[57] ABSTRACT

In a method and apparatus for awarding a prize in a commercial establishment which includes at least one data terminal for communicating over at least one data line with a central processing unit, the communicating of the at least one data terminal including a data stream of information representing a commercial transaction performed at the data terminal, the improvements are:

a) detecting the data stream;
b) extracting signals identifying the commercial transaction performed at the at least one terminal from the detected data stream;
c) comparing the identifying signals with predetermined reference signals and generating an enabling signal when a predetermined relationship exists between the reference and identifying signals; and
d) generating a win signal upon receipt of the enabling signal; and, for awarding a prize based on the win signal.

18 Claims, 1 Drawing Sheet

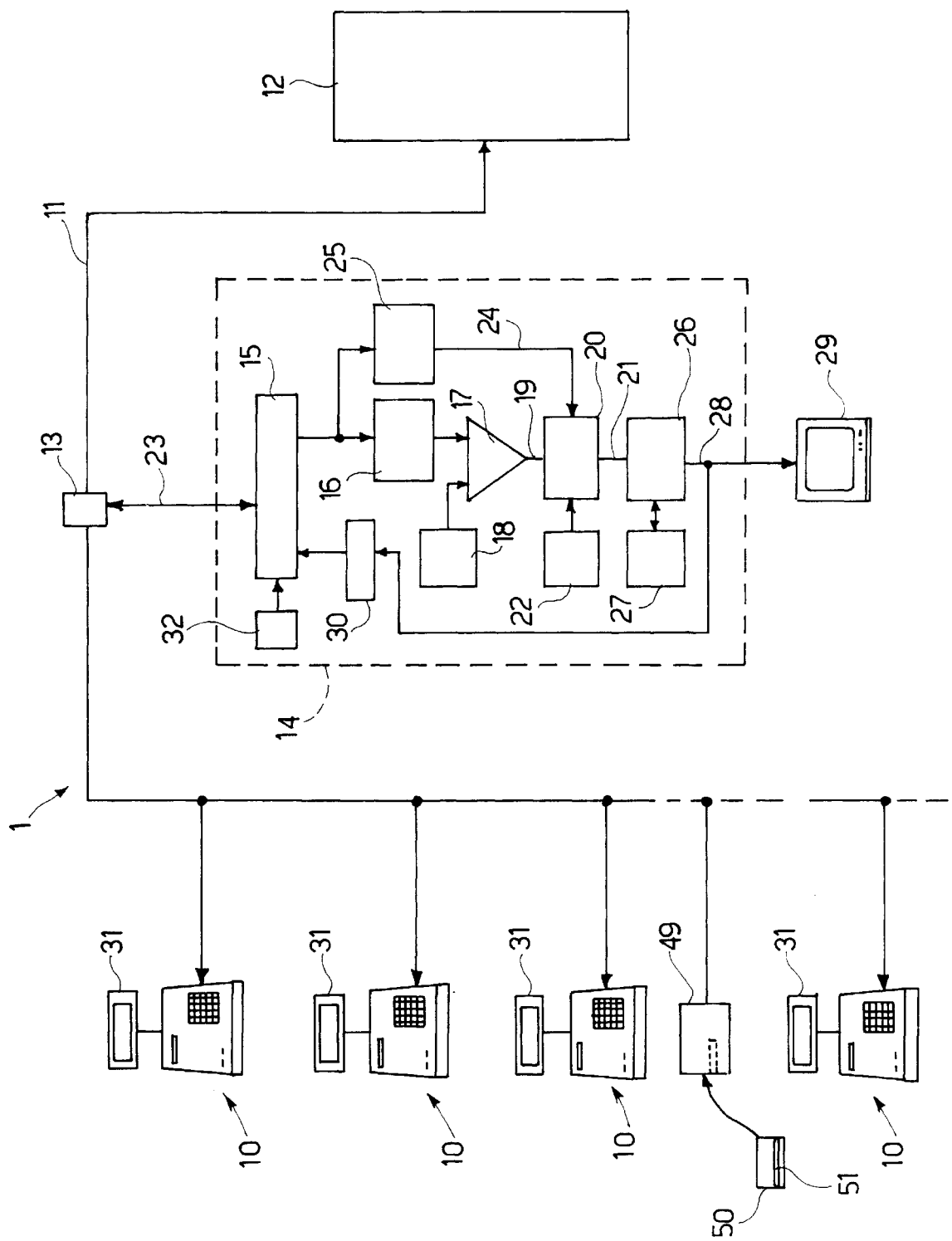

PRIZE AWARDING REMOTE TERMINAL BASE SYSTEM

BACKGROUND OF THE INVENTION

The present invention relates to a prize awarding system.

More specifically, the present invention relates to a prize awarding system for commercial or financial establishments (e.g. a supermarket, bank, motorway pay toll, etc.) featuring one or more terminals which may be cash registers, identification card (e.g. credit card) readers, etc.

Commercial establishments are known wherein the workstations consist of terminals of a computer control system featuring a central processing unit. In such systems, each terminal is connected over a data line to the central processing unit which receives and processes data from the terminal, and supplies the terminal with the processed data.

SUMMARY OF THE INVENTION

It is an object of the present invention to provide a prize awarding system designed for application to a system featuring one or more terminals as described above.

It is a further object of the present invention to provide a prize awarding system which does not interfere with the normal running of the establishment.

According to the present invention, there is provided a prize awarding system designed for application to a system featuring at least one terminal communicating over at least one data line with at least one central processing unit;

said terminal generating a data stream along said data line following performance of an operation;

characterized in that it comprises:

detecting means for detecting said data stream;

selecting means cooperating with said detecting means, for extracting, from said data stream, signals identifying the operation performed by said terminal;

comparing means for comparing said identification signals with reference signals, and emitting an enabling signal on detecting a predetermined relationship between said identification signals and said reference signals; and means for generating a win probability signal in the presence of said enabling signal.

BRIEF DESCRIPTION OF THE DRAWING

A preferred non-limiting embodiment of the present invention will be described by way of example with reference to the accompanying drawing.

DETAILED DESCRIPTION OF THE INVENTION

The accompanying drawing shows a prize awarding system 1 wherein a number of terminals 10 are connected over a transmission line 11 (e.g. an optical fiber line, radio line, etc.) to a central processing unit 12.

In the example shown, terminals 10 are conveniently cash registers.

Each terminal 10 is supplied by central processing unit 12 with data, e.g. product prices, stored in the unit, and supplies unit 12 with data relative to sales. Such a system is known and therefore requires no detailed description.

According to the present invention, a detecting element 13 is provided along transmission line 11, for connecting line 11 to an auxiliary device 14, supplying auxiliary device 14 with a copy of the data stream along line 11, and permitting data supply from auxiliary device 14 to line 11; which element 13 may, for example, be a through outlet located at any point along line 11 between terminals 10 and central processing unit 12.

Device 14 comprises an adapting circuit 15 for adapting the signals on line 11 to those of device 14 and vice versa, and which may, for example, be a straightforward serial/parallel, parallel/serial or protocol converter. Adapting circuit 15 is of known type and therefore not described in detail, and its precise structure depends on the type of signals and protocol employed for data transmission over line 11.

Detecting element 13 and adapting circuit 15 are designed to monitor data flow between terminals 10 and processing unit 12 without interfering with the data, so that the signals emitted by terminals 10 and transmitted over line 11 to central processing unit 12 are also acquired in parallel by device 14.

More specifically, the signals transmitted over line 11 are detected by adapting circuit 15 by which they are appropriately converted and supplied to a first selecting device 16 for extracting, from the data stream, information relative to the products purchased at terminals 10 and which is transmitted by terminals 10 to central processing unit 12.

Device 16 generates product identification signals (e.g. alphanumeric product identification codes, such as bar codes) which are supplied to a comparing device 17.

Comparing device 17 compares the alphanumeric identification codes generated by device 16 with predetermined codes stored in a memory 18; and, upon at least one identification code from device 16 being found to match a predetermined stored code, an enabling signal 19 is generated. (For example, enabling signal 19 may be generated upon comparing device 17 detecting the purchase of a product or group of products whose identification codes match those stored in memory 18).

Enabling signal 19 is supplied to a pseudo-random (or programmed) device 20 for generating a win signal 21.

On receiving enabling signal 19, device 20 emits a win signal 21 with an adjustable probability P depending on a number of predetermined conditions. More specifically, probability P depends on predetermined parameters stored in a memory 22, and on selection signals 24 supplied by a probability selecting device 25 associated with adapting circuit 15.

For example, the parameters in memory 22 may govern win probability P according to the alphanumeric codes supplied by device 16, and hence the products purchased, or according to the day of the week or the time of day; or may also define times outside which no prizes may be awarded.

Selecting device 25 provides for also modifying probability P as a function of the traffic detected along line 11, e.g. for reducing probability P alongside an increase in customer traffic at terminals 10 (and hence in the amount of data transmitted along line 11).

Pseudo-random generating device 20 supplies win signal 21 to a prize awarding device 26 cooperating with a memory 27 containing a number of prize codes. The prize code may be selected at random by device 26 from memory 27, or on the basis of predetermined conditions stored in memory 27 and whereby the prize may be proportional to the sum of the purchases made, or related to specific products.

Device 26 supplies a prize awarding signal 28 to a win indicating device 29 which may be a display (e.g. an indicator light panel, television screen, etc.) possibly associated with an acoustic device (not shown).

In addition to or in lieu of indicating device 29, signal 28 may be supplied to a coding circuit 30 for converting it into a signal transmittable via adapting circuit 15 to line 11, thus enabling signal 28 to be transmitted to terminal 10 at which the winning purchase was made. In this case, each terminal 10 presents a display 31 for indicating the winning purchase made at that particular terminal, and which, possibly also comprising an acoustic signal, may be either the standard alphanumeric display of the terminal itself, or an auxiliary display.

Finally, to prevent fraud, device 14 may comprise a protection circuit 32 cooperating with circuit 15 and which only enables prizes to be awarded under certain predetermined conditions, e.g. following entry of a protection code, during trading hours, etc.

In actual use, device 14 is connected to transmission line 11 via detector 13; and the relative data is entered into memories 18, 22 and 27. Memory 18 is loaded with the parameters relative to the prize winning purchases. For example, memory 18 may be so programmed that prizes are awarded for purchasing a given number of a given product, a given number of products of the same brand, or a combination of different products and brands, so that the conditions governing awarding of the prizes may be adapted to the marketing and advertising requirements of given products.

Memory 22 is loaded with the rules for modifying win probability P, and memory 27 with the available prizes and any relationship between each prize and other predetermined parameters such as the type of purchase or the total sum spent. The prizes may of course be tangible items, or consist wholly or in part of discounts on the goods purchased.

All the above entries may be made, for example, by the firm installing and running device 14; and, following installation, device 14 may conveniently be sealed to prevent tampering and for conforming with gaming regulations.

Device 14 may be enabled, e.g. by means of protection device 32, to perform the above operations automatically during normal operation of terminals 10.

Each terminal 10 supplies central processing unit 12 with data relative to the purchases made at the terminal; which data is also transmitted by detector 13 to device 14 which extracts from it information relative to the number and type of products purchased. The extracted information is compared with the data stored in memory 18, and, if a match is detected between the purchased products and the conditions governing awarding of the prizes, generating device 20 is enabled for emitting a win signal 21, the probability of which depends on the content of memory 22 and on the signals generated by device 25.

If no win signal 21 is generated, the customer receives the cash register total and pays normally. Conversely, in the event a win signal 21 is generated, a code corresponding to a prize (or discount) is selected in memory 27, and the prize (or discount) is shown on display 29, possibly accompanied by an acoustic signal to draw the attention of customers and staff. Alternatively, win signal 21 is coded by coding circuit 30 and sent along line 11 to the relative terminal 10; and the corresponding win indicator 31 is enabled to indicate the relative prize.

Once the prize is awarded, the corresponding code is deleted from memory 27.

The present invention therefore provides for a fully automatic auxiliary prize awarding system which is easy to install, and applicable to a standard centralized cash register system. Clearly, the embodiment described is purely indicative, and changes may be made to system 1 without, however, departing from the scope of the present invention.

For example, terminal 10 may also comprise a reader 49 for reading identification cards 50, in particular with a magnetic band 51, optical band or microprocessor.

In this case, generating device 20 may also provide for generating win signal 21 upon card 50 being presented a given number of times within a given time period, e.g. six months (repeat custom award).

We claim:

1. A prize awarding system comprising:
   at least one data line (11) and terminal (10, 49), said terminal (10, 49) generating a data stream along said data line indicating a first commercial transaction relative at least to a first product;
   detecting means (13) for detecting said data stream;
   selecting means (16) cooperating with said detecting means (13) for extracting from said data stream signals identifying said first commercial transaction and first product;
   comparing means (17) for comparing said signals with codes stored in a memory (18) identifying a second commercial transaction and second product and emitting an enabling signal (19) on detecting a predetermined relationship between said first and second commercial transaction and products; and
   generating means (20) for generating a win probability signal in the presence of said enabling signal (19).

2. A system as claimed in claim 1, wherein said generating device (20) is responsive to said win probability signal with an adjustable probability P for generating a win signal (21).

3. A system as claimed in claim 2, characterized in that said probability P depends on selection signals generated by probability selecting means (25).

4. A system as claimed in claim 3, characterized in that said probability selecting means (25) are supplied with signals indicating the traffic conditions along said data line (11).

5. A system as claimed in claim 2, characterized in that said pseudo-random generating means (20) supply said win signal (21) to prize awarding means (26) in which prize codes and awarding conditions are stored for said prize awarding means (26) to supply a prize awarding signal (28) to indicating means (29, 31).

6. A system as claimed in claim 5, characterized in that said indicating means (31) is at said terminal (10, 49).

7. In a method for awarding a prize in a commercial establishment which includes at least one data terminal for communicating over at least one data line with a central processing unit, said at least one data terminal communicating a data stream of information representing a first commercial transaction relative at least to a first product performed at said data terminal, the improvements comprising the steps of:
   a) detecting said data stream;
   b) extracting identification signals identifying said first commercial transaction and first product from said detected data stream;
   c) comparing said identification signals with predetermined reference signals identifying a second commercial transaction and second product, and emitting an enabling signal when a predetermined relationship exists between said first and second commercial transactions and products; and
   d) generating a win signal in response to said enabling signal for awarding a prize based on said win signal.

8. The method of awarding prizes as claimed in claim 7, wherein generating said win signal further comprises providing a probability of said generating of said win signal as a function of predetermined parameters.

9. The method of awarding prizes as claimed in claim 8, further including the step of supplying said win signal to a prize awarding means for generating a prize awarding signal representing a prize to be awarded.

10. The method of awarding prizes as claimed in claim 7, wherein the step of generating said prize awarding signal includes randomly selecting a prize code.

11. Prize awarding system wherein a number of cash registers (10) or readers (49) for identification cards are connected over at least one transmission line (11) to at least one central processing unit (12); each cash register (10) or reader (49) for identification cards supplying said processing unit (12) date relative to sales;

said prize awarding system comprising a detecting element (13) provided along said transmission line (11) for supplying a copy of the data stream along the transmission line to an auxiliary device (14);

said detecting element monitoring data stream between said cash registers (10) or readers(49) for identification cards and said central processing unit (12) without interfering with the data so that the signals emitted by each cash register (10) or reader (49) for identification cards and transmitted over said transmission line are also acquired in parallel by said auxiliary device (14), said auxiliary device further comprising:

a selecting device (16) receiving said signals from the transmission line; said selecting device (16) extracting identification codes relative to the products purchased at the cash registers (10) or reader (49) for identification cards;

comparing device (17) comparing the extracted identification codes with predetermined stored (18) codes for generating an enabling signal upon at least one extracted identification code being found to match a predetermined stored code, pseudo random device (20) receiving said enabling signal for emitting a win signal (21) with an adjustable probability (P) depending on a number of predetermined conditions, prize awarding device (26) receiving said win signal (21) and co-operating with a memory (27) containing a number of prize or discount codes so that in the event that a win signal is generated, a code corresponding to a prize or a discount is selected in said memory (27) and the prize or discount is shown to a customer.

12. A system as claimed in claim 11, wherein said adjustable probability depends on selection signals generated by probability selecting means (25).

13. A system as claimed in claim 12, wherein said probability selecting means (25) are supplied with signals indicating the traffic conditions along said data line for reducing said probability alongside an increase in customer traffic at said cash registers (10) or reader (49) for identification cards.

14. A system as claimed in claim 11, wherein display means (29) co-operate with said prize awarding device (26) to display said prize or discount.

15. A system as claimed in claim 11, wherein coding means (30) are interposed between said data line (11) and said prize awarding device (26) for coding said win signal (21) and sending the signal to a cash register (10) or reader (49) for identification cards that is provided with display means (31) for indicating a winning purchase made at that particular cash register (10) or reader (49) for identification cards.

16. A system as claimed in claim 11, further comprising a protection device (32) for supplying prize awarding enabling signals under predetermined memorised condition.

17. A system as claimed in claim 11, wherein said pseudo random device (20) generates said: win signal (21) upon a given amount of expenditure being detected as said cash register (10) or reader (49) for identification cards.

18. A system as claimed in claim 11, wherein said pseudo random device (20) generates said win signal (21) upon said identification card (50) being presented a given number of times within a given period.

* * * * *